(12) United States Patent
Mathias et al.

(10) Patent No.: US 9,959,869 B2
(45) Date of Patent: May 1, 2018

(54) ARCHITECTURE FOR MULTI-DOMAIN NATURAL LANGUAGE PROCESSING

(71) Applicant: Amazon Technologies, Inc., Seattle, WA (US)

(72) Inventors: Lambert Mathias, Arlington, MA (US); Ying Shi, Seattle, WA (US); Imre Attila Kiss, Arlington, MA (US); Ryan Paul Thomas, Redmond, WA (US); Frederic Johan Georges Deramat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/694,996

(22) Filed: Sep. 4, 2017

(65) Prior Publication Data

US 2018/0012597 A1 Jan. 11, 2018

Related U.S. Application Data

(63) Continuation of application No. 15/256,176, filed on Sep. 2, 2016, now Pat. No. 9,754,589, which is a continuation of application No. 14/754,598, filed on Jun. 29, 2015, now Pat. No. 9,436,678, which is a
(Continued)

(51) Int. Cl.
| | |
|---|---|
| *G10L 15/00* | (2013.01) |
| *G10L 15/22* | (2006.01) |
| *G10L 15/26* | (2006.01) |
| *G06F 17/27* | (2006.01) |
| *G10L 13/08* | (2013.01) |

(52) U.S. Cl.
CPC ............ *G10L 15/22* (2013.01); *G06F 17/277* (2013.01); *G06F 17/278* (2013.01); *G06F 17/279* (2013.01); *G10L 13/08* (2013.01); *G10L 15/26* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 7,925,507 | B2 | 4/2011 | Weng et al. |
| 8,447,607 | B2 | 5/2013 | Weider et al. |
| 8,473,299 | B2 | 6/2013 | Di Fabbrizio et al. |

(Continued)

*Primary Examiner* — Jesse Pullias
(74) *Attorney, Agent, or Firm* — Knobbe, Martens, Olson & Bear, LLP (57) ABSTRACT

Features are disclosed for processing a user utterance with respect to multiple subject matters or domains, and for selecting a likely result from a particular domain with which to respond to the utterance or otherwise take action. A user utterance may be transcribed by an automatic speech recognition ("ASR") module, and the results may be provided to a multi-domain natural language understanding ("NLU") engine. The multi-domain NLU engine may process the transcription(s) in multiple individual domains rather than in a single domain. In some cases, the transcription(s) may be processed in multiple individual domains in parallel or substantially simultaneously. In addition, hints may be generated based on previous user interactions and other data. The ASR module, multi-domain NLU engine, and other components of a spoken language processing system may use the hints to more efficiently process input or more accurately generate output.

20 Claims, 5 Drawing Sheets

Related U.S. Application Data continuation of application No. 13/720,909, filed on Dec. 19, 2012, now Pat. No. 9,070,366.

(56) References Cited

U.S. PATENT DOCUMENTS

| | | |
|---|---|---|
| 8,566,102 B1 | 10/2013 | Bangalore et al. |
| 9,070,366 B1 | 6/2015 | Mathias et al. |
| 9,436,678 B2 * | 9/2016 | Mathias et al. |
| 9,754,589 B2 * | 9/2017 | Mathias ................. G10L 15/22 |
| 2005/0182628 A1 | 8/2005 | Choi |
| 2006/0080107 A1 | 4/2006 | Hill et al. |
| 2007/0033005 A1 | 2/2007 | Cristo et al. |

* cited by examiner

ARCHITECTURE FOR MULTI-DOMAIN NATURAL LANGUAGE PROCESSING

CROSS-REFERENCE TO RELATED APPLICATIONS

This application is a continuation of U.S. application Ser. No. 15/256,176, filed Sep. 2, 2016, now U.S. Pat. No. 9,754,589, which is a continuation of U.S. patent application Ser. No. 14/754,598, filed Jun. 29, 2015, now U.S. Pat. No. 9,436,678, which is a continuation of U.S. application Ser. No. 13/720,909, filed Dec. 19, 2012, now U.S. Pat. No. 9,070,366, all three of which are incorporated by reference herein.

BACKGROUND

Spoken language processing systems include various modules and components for receiving speech input from a user, determining what the user said, and determining what the user meant. In some implementations, a spoken language processing system includes an automatic speech recognition ("ASR") module that receives audio input of a user utterance and generates one or more likely transcriptions of the utterance. Spoken language processing systems may also include a natural language understanding ("NLU") module that receives textual input, such as a transcription of a user utterance, and determines the meaning of the text in a way that can be acted upon, such as by a computer application. For example, a user of a mobile phone may speak a spoken command to initiate a phone call. Audio of the spoken command can be transcribed by the ASR module, and the NLU module can determine the user's intent (e.g., that the user wants to initiate the phone call feature) from the transcription and generate a command to initiate the phone call.

Text-to-speech ("TTS") systems convert text into sound using a process sometimes known as speech synthesis. In a common implementation, a TTS system may receive text input and provide an audio presentation of the text input to a user. For example, a TTS system may be configured to "read" text to a user, such as the text of an email or a list of reminders.

Some systems combine both speech recognition and TTS. For example, global positioning systems ("GPS") can receive a user's spoken input regarding a particular address, generate directions for travelling to the address, and aurally present the directions to the user. In many cases, users may then continue to interact with such systems while receiving directions. After the GPS system provides the next direction or series of directions, the user may use one of any number of predetermined commands (e.g., "cancel route," "next turn"). In addition, other non-spoken user interactions may be used to interact with content that is presented aurally. For example, turn-by-turn directions can be displayed via a touch screen display that allows users to select, via a touch screen or keyboard, a particular route to bypass.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Spoken language processing systems can perform more efficiently and accurately when they know the subject matter to which the spoken interactions that they process relate. For example, an automatic speech recognition ("ASR") module of a spoken language processing system may utilize various models (e.g., language models, acoustic models) when determining the content of a spoken user interaction, also known as an utterance. The ASR module may utilize specialized models for a particular subject matter, also known as a domain, when the ASR module knows the domain to which the utterance relates. Such specialized models can improve the efficiency and accuracy of the ASR module. Other modules of a spoken language processing system, such as a natural language understanding ("NLU") module, may interpret the user's words (e.g., as received from an ASR module) to determine what action the user would like to initiate, also known as a user intent. An NLU module may be configured to interpret the user's words into an action within a particular domain. If the user's words do not support an interpretation within the particular domain for which the NLU module is configured, the NLU processing may be inefficient and error-prone, or the NLU module may not be able to generate any reasonable interpretation.

Some spoken language processing systems are configured to process utterances within one of any number of different domains. Such systems choose one domain in which to process an utterance. For example, a system may expect a user utterance to relate to a currently active domain and therefore only process the utterance with respect to that particular domain. A user may initially wish to get directions, and may initiate a series of interactions (e.g., utterances and responses) with the spoken language processing system in order to get directions. At some point while the user is getting directions, the user may decide to perform a different task instead, such as initiating playback of music. The user may issue a spoken command to initiate playback of music. However, the spoken language processing system, expecting an utterance in the "directions" domain, may not understand or may misinterpret the spoken command. In some cases, the spoken language processing system may not understand the spoken command even if the spoken command is formed properly such that it would be understood by the spoken language processing system if it was processed in the music domain.

Aspects of this disclosure relate to processing user utterances in multiple domains and, based on the results, selecting the most likely or appropriate domain in which to generate a response or otherwise take further action. A user utterance may be processed by an ASR module. A transcription or N-best list of transcriptions from the ASR module may be provided to a multi-domain NLU engine. The multi-domain NLU engine may use any number of individual domain-specific NLU modules to process the transcription in multiple domains at the same time or substantially the same time (e.g., in parallel or asynchronously). After the domain-specific NLU modules have produced results (e.g., determined one or more likely interpretations) and, optionally, scores for those results (such as a confidence score or a likelihood score), the most likely or appropriate interpretation may be selected. In this way, a spoken language processing system may be more responsive to user utterances and allow users to arbitrarily switch domains without first informing the spoken language processing system of the domain to which the user is switching for a particular utterance.

Additional aspects of the disclosure relate to analyzing previous user interactions and generating processing hints, also referred to herein simply as hints, to aid in processing of user utterances. Each user interaction with a user device or a spoken language processing system may create history, or context, that can be used to determine the user's intent when processing a subsequent utterance. In addition, specific hints may be generated regarding what the user is likely to do next. For example, a user may engage in a series of directions-related and music-related activities (e.g., getting driving directions to various locations and playing music from various artists). History regarding these activities may be saved and then considered by the various modules of the spoken language processing system. Subsequent interactions may be more likely to relate to the same or similar domains as the previous interactions. In addition, recent interactions may be used to generate hints regarding what the user would like to do next. For example, if a spoken language processing system prompts a user for the artist or title of a requested song, there is a substantial likelihood that the next user utterance will relate to an artist or a song title. However, as mentioned above, the utterance may be processed in multiple domains so that if the user does decide to do something different or otherwise does not provide an artist or song title, the spoken language processing system may still process the utterance accurately and respond appropriately.

Although aspects of the embodiments described in the disclosure will focus, for the purpose of illustration, on a spoken language processing system exchanging data with a separate client device via a network, one skilled in the art will appreciate that the techniques disclosed herein may be applied to any number of software processes or applications. For example, a client device may include a speech recognition engine and provide the features described herein for processing user utterances in multiple domains to determine the most appropriate domain for any given utterance. Various aspects of the disclosure will now be described with regard to certain examples and embodiments, which are intended to illustrate but not limit the disclosure.

Figure 1:
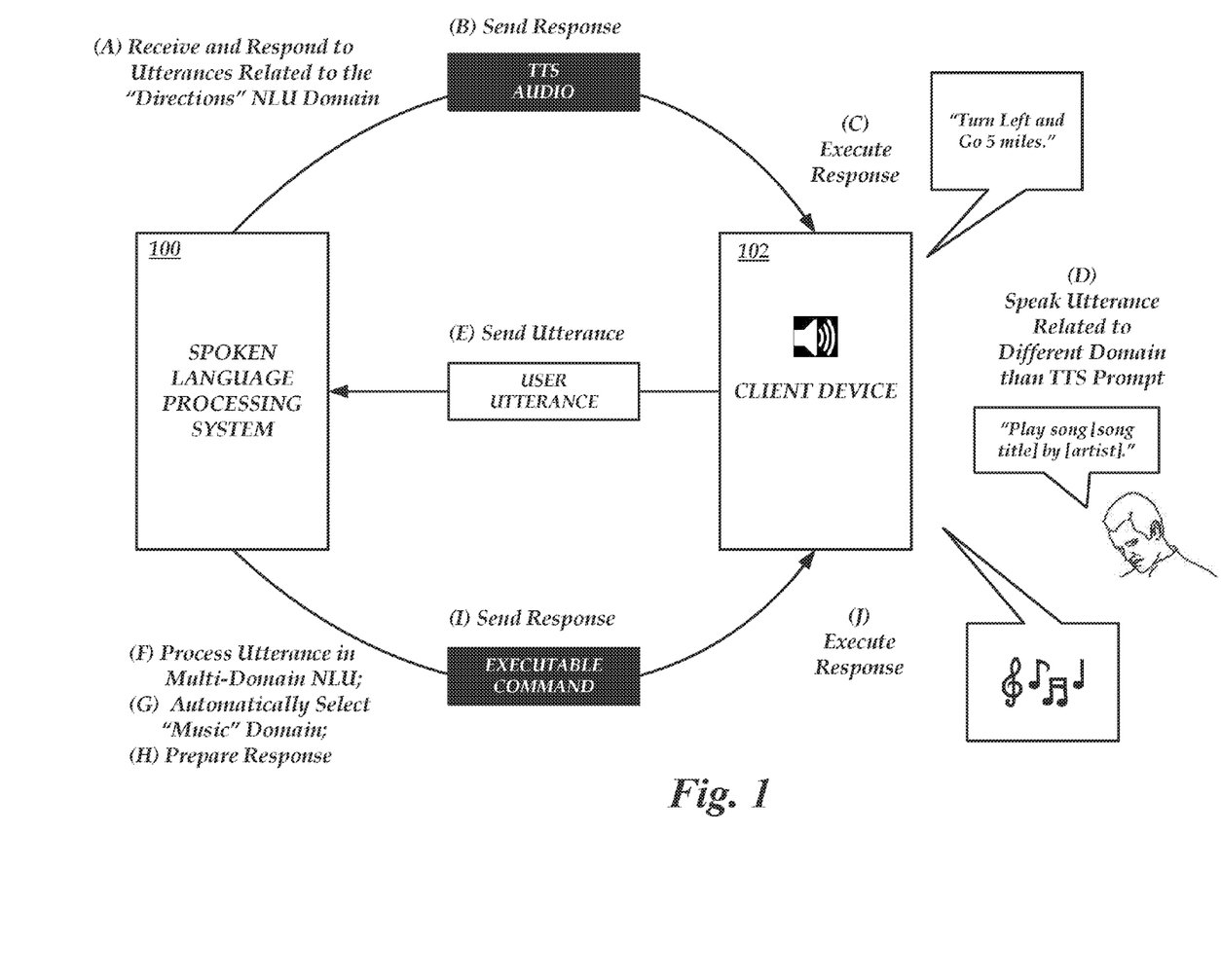
FIG. 1 is a block diagram of an illustrative networked environment in which a spoken language processing system may be implemented, showing illustrative interactions between a spoken language processing system, a client device, and a user.

With reference to an illustrative example, a user may issue spoken commands or otherwise make spoken utterances to a client device, such as a mobile phone or tablet computer. The utterances may be transmitted to a network-accessible speech recognition server, which processes the utterances and returns a response. FIG. 1 illustrates such a spoken language processing system 100 in communication with a client device 102.

The spoken language processing system 100 may use an ASR module to process the utterance and transcribe what the user said. In addition, history data may be saved regarding the utterance. The history data may include a copy of the transcription or N-best transcriptions, or summary data regarding the transcription. The history data may also include a timestamp so that the spoken language processing system 100 may determine which history data is the most recent, etc.

The spoken language processing system 100 may use a multi-domain NLU engine to determine what the user would like to do, also known as the user intent, based on the transcription from the ASR module. The multi-domain NLU engine may also consider hints or history based on previous user interactions or other data when determining the user intent. The multi-domain NLU engine can include any number of domain-specific NLU modules configured to operate on text related to a particular subject matter or in a particular domain (e.g., getting directions, shopping, initiating communication with a contact, performing a search, or playing music). Domain-specific NLU modules may process text, such as a transcription, with respect to a particular domain and produce a result indicating the user's intent. Such domain-specific NLU modules are known in the art and will not be described in detail here.

Advantageously, in a multi-domain NLU engine, each of the domain-specific NLU modules can process the transcription in parallel, with each module producing a separate result indicating the user's intent (e.g., the user wants directions, or the user wants to listen to music). The multi-domain NLU engine or some other module or component of the spoken language processing system 100 can then select a particular domain-specific result on which the spoken language processing system 100 will base its response. The selection may be based on a likelihood that each individual result is reflective of the user's actual intent.

As illustrated in FIG. 1, the spoken language processing system 100 may receive and respond to several utterances related to the "directions" domain at (A). For each of the utterances, however, the domain-specific NLU modules for other domains also process the utterance in parallel with the directions domain-specific NLU module. The results returned from the other domain-specific NLU modules may be less likely to reflect the user's actual intent, however, due to the language used by the user and the language that is typically used when a user intends to interact with the individual domains. As a result, the spoken language processing system 100 may decide to produce a response to the utterance based on the result returned by the directions domain-specific NLU module.

In some cases, the response generated by the spoken language processing system 100 may be a clarifying question (e.g., if the user utterance was ambiguous), requested information (e.g., if the user utterance requested driving directions), a command for execution by the client device (e.g., if the user utterance was a spoken command to initiate voice dialing of a phone), etc. For example, the spoken language processing system 100 may use a text-to-speech ("TTS") module to generate synthesized speech that the user may consume or with which the user may interact. If the user has submitted spoken commands requesting driving directions, the spoken language processing system 100 may use the TTS module to generate audio of the driving directions. The spoken language processing system 100 may transmit the TTS audio to the client device 102 at (B). The client device 102 may receive the TTS audio and play it to the user at (C). As seen in FIG. 1, the TTS audio may include directions that the user requested.

After any number of utterances related to the directions domain, the user may issue a spoken command that is related to a different domain at (D). Illustratively, the user utterance may be "Play Beethoven's 5th Symphony." Such an utterance is a command to initiate playback of a particular musical recording. The client device 102 may transmit data regarding the user's utterance to the spoken language processing system 100 at (E).

After generating a transcript for the utterance through the use of the ASR module, the spoken language processing system 100 can process the utterance in a multi-domain NLU engine at (F). In the present example, the NLU module for the music domain may produce several potential interpretations, including one indicating that the user intends to hear a recording of Beethoven's 5th Symphony, while the NLU module for the directions domain may return several potential interpretations, including one indicating that the user intends to get directions to a restaurant named Beethoven's that is located on 5th Street. There may be any number of other domain-specific NLU modules that return results, and the results may be more or less plausible depending on the particular domain.

In addition to the results, the domain-specific NLU modules may, in some embodiments, return scores regarding the likelihood that each result corresponds to the user's actual intent. In the current example, the result from the music domain may have a high score because Beethoven's 5th Symphony is an actual music recording. In addition, if the user has access to a musical recording of Beethoven's 5th Symphony, the score may be further increased. Moreover, if the user's recent history includes other requests to hear music recordings of Beethoven's music or those of another classical composer, the score may be increased further. The result from the directions domain may also have a relatively high score, due to the recent history of directions-related interactions. The score may be relatively high particularly if there is a restaurant named Beethoven's and the restaurant is on 5th Street. However, due to the lack of a completely applicable result (e.g., the terms "play" and "symphony" do not relate to directions), the score may be low enough that the music domain interpretation's score is higher and therefore is the one on which the spoken language processing system 100 bases its response.

After automatically selecting the interpretation from the music domain at (G), the spoken language processing system 100 can prepare a response at (H). In the current example, the response may be an executable command that the client device 102 executes. The executable command may indicate the task to perform (e.g., play music), and parameters or other data relevant to the task (e.g., a song ID or the artist and song title). The spoken language processing system 100 can transmit the response to the client device 102 at (I). The client device 102 can execute the response at (J), playing the requested musical performance to the user. In some embodiments, the spoken language processing system 100 can prepare other responses, such as streaming the selected song, causing another system to stream the selected song, etc. In practice, the response executed by or transmitted from the spoken language processing system 100 can vary depending on the domain and the capabilities of the client device 102, among other factors.

Distributed Spoken Language Processing System Environment

Figure 2:
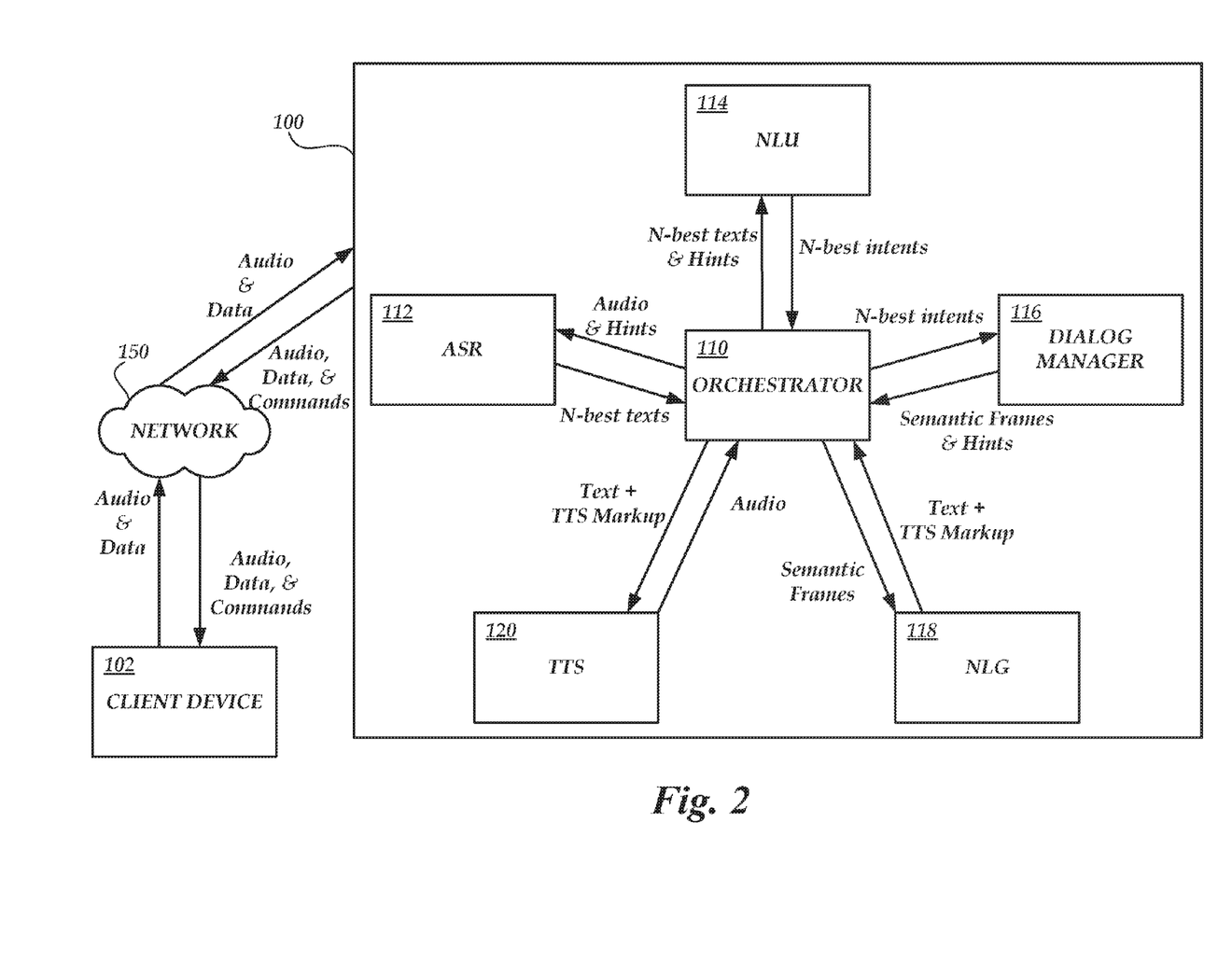
FIG. 2 is a block diagram of an illustrative spoken language processing system showing data flows between various modules.

Prior to describing embodiments of processes for analyzing user utterances in a multi-domain NLU engine in detail, several illustrative interactions and an example environment in which the processes may be implemented will be described. FIG. 2 illustrates a spoken language processing system 100 and a client device 102. The spoken language processing system 100 can be a network-accessible system in communication with the client device 102 via a communication network 150, such as a cellular telephone network or the Internet. A user may use the client device 102 to submit utterances, receive information, and initiate various processes, either on the client device 102 or at the spoken language processing system 100. For example, the user can issue spoken commands to the client device 102 in order to get directions or listen to music, as described above.

The client device 102 can correspond to a wide variety of electronic devices. In some embodiments, the client device 102 may be a mobile device that includes one or more processors and a memory which may contain software applications executed by the processors. The client device 102 may include a speaker or other audio output component for presenting or facilitating presentation of audio content. In addition, the client device 102 may contain a microphone or other audio input component for accepting speech input on which to perform speech recognition. Illustratively, the client device 102 may be a mobile phone, personal digital assistant ("PDA"), mobile gaming device, media player, electronic book reader, tablet computer, laptop computer, and the like. The software of the client device 102 may include components for establishing communications over wireless communication networks or directly with other computing devices.

The spoken language processing system 100 can be any computing system that is configured to communicate via a communication network. For example, the spoken language processing system 100 may include any number of server computing devices, desktop computing devices, mainframe computers, and the like. In some embodiments, the spoken language processing system 100 can include several devices physically or logically grouped together, such as an application server computing device configured to perform speech recognition on an utterance and a database server computing device configured to store records and speech recognition models.

The spoken language processing system 100 can include an orchestrator module 110, an ASR module 112, a multi-domain NLU engine 114, a dialog manager 116, a natural language generation ("NLG") module 118, and a TTS module 120. In some embodiments, the spoken language processing system 100 can include various modules and components combined on a single device, multiple instances of a single module or component, etc. For example, the spoken language processing system 100 may include a separate orchestrator 110 server that may be configured with a dialog manager module 116; a server or group of servers configured with ASR and NLU modules 112, 114; and a server or group of servers configured with NLG and TTS modules 118, 120. In multi-device implementations, the various devices of the spoken language processing system 100 may communicate via an internal communication network, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network 150. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 150 may be a publicly accessible network of linked networks, possibly operated by various distinct parties, such as the Internet. In other embodiments, the network 150 may include a private network, personal area network ("PAN"), LAN, WAN, cable network, satellite network, etc. or some combination thereof, each with access to and/or from the Internet. For example, the devices of the spoken language processing system 100 may be located within a single data center, and may communicate via a private network as described above. The client device 102 may communicate with spoken language processing system 100 via the Internet. The client device 102 may have access to the Internet via a wired or WiFi connection, or via a cellular telephone network (e.g., a Long Term Evolution or LTE network).

In operation, the client device 102 may transmit audio and other data to the spoken language processing system 100, and receive audio, executable commands, and other data from the spoken language processing system 100 in response. The orchestrator 110 may oversee receipt of input from the client device 102 and routing of the data within the spoken language processing system 100 in order to process the input and generate a response.

For example, the input from the client device 102 may be a user utterance transmitted to the spoken language processing system 100 via the network 150. The orchestrator 110 may route the utterance to the ASR module 112 to be processed into a transcription or a lattice or N-best list of transcriptions. Hints can be provided to the ASR module 112 to aid in processing. Illustratively, a hint may be used to inform the ASR module 112 that the utterance is likely to include a title to a song by a particular artist because the user was just prompted for a song title after requesting to hear music by the artists. The ASR module 112 may use the hint to narrow its search space regarding which words may be included in the utterance, potentially providing an improvement in efficiency and accuracy.

The transcription or N-best list of transcriptions generated by the ASR module 112 can be provided to the multi-domain NLU engine 114 to determine the specifics of the request and to formulate a command to satisfy the request. In addition, the dialog manager 116 or some other component of the spoken language processing system 100 may generate a hint for the multi-domain NLU engine 114, such as data indicating the likelihood that the transcription relates to a song title of the particular artist due to the previous TTS prompt to the user for a song title to play. By hinting this likelihood to the multi-domain NLU engine 114, NLU processing may determine the user's intent more efficiently and accurately, and scores, if used, may be weighted accordingly. If additional information is required (e.g., the utterance was ambiguous or did not include all necessary information), the orchestrator 110 may provide data to the dialog manager 116 regarding the most likely user intents. The dialog manager 116 can then formulate a response to the user that prompts the user for the appropriate information. The response may be generated in the form of semantic frames (or some other semantic representation of text) which indicate the information that is required or desirable. Another component, such as the NLG module 118, can generate text for the question to be asked of the user.

When text or synthesized speech is to be transmitted to the client device 102, information about the desired output may be provided to an NLG module 118 in the form of semantic frames to generate natural language text for the responses and prompts. In some embodiments, hints may also be provided to aid in NLG processing. The NLG module 118 can analyze the semantic frame (e.g., prompt the user for more information about getting directions to a specific location). The NLG module 118 can then generate textual content (including TTS markup regarding the words on which to put spoken emphasis, and other such features of spoken language) that sounds natural when read or synthesized into speech by the TTS module 120.

The orchestrator 110 may employ the TTS module 120 to generate an audio presentation of text content and TTS markup, whether the text is a user prompt, information requested by the user, or some other text. The orchestrator 110 may then transmit the audio generated by the TTS module 120 to the client device 102. In addition, the orchestrator 110 or some other component of the spoken language processing system 100 may save history regarding the fully processed interaction, generate hints for subsequent interactions, and the like.

Figure 3:
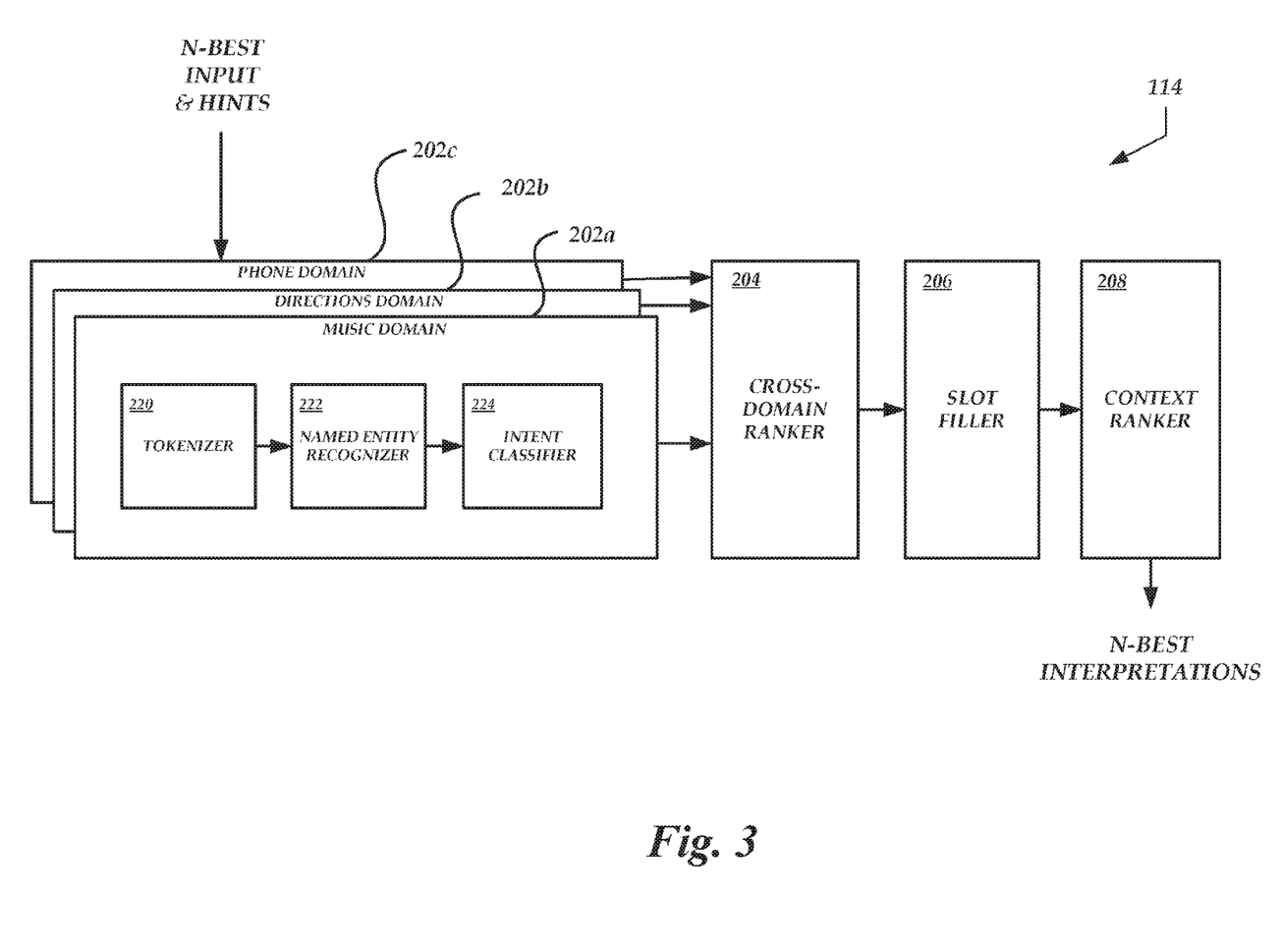
FIG. 3 is a block diagram of an illustrative multi-domain natural language understanding module.

FIG. 3 illustrates a detailed example of a multi-domain NLU engine 114. The multi-domain NLU engine 114 can receive transcriptions of user utterances, textual input from users (e.g., input that users have typed on a client device 102 and submitted) or other textual input. The multi-domain NLU engine 114 can output interpretations of the textual input that may be acted upon by other components of the spoken language processing system 100. The interpretations may include a user intent (e.g., "play a song") and one or more named entities that add information to be used in acting upon the user intent (e.g., a "song" entity with a value "Gimme Shelter" and an "artist" entity with a value "Rolling Stones").

A multi-domain NLU engine 114 may include any number of single-domain NLU modules 202. For example, the multi-domain NLU engine 114 may include a music domain 202a, a directions domain 202b, and a phone dialing domain 202c. A cross-domain ranker 204 may receive the results provided by various single-domain NLU modules 202 (e.g., the N-best list from each single domain NLU module 202) and compile them into a combined result (e.g., one N-best list including the results from all single-domain NLU modules 202). The slot filler 206 can correct erroneous data in the results (e.g., correct song titles by checking against a catalog of known song titles). In addition, the slot filler 206 can filter data that is included in the results so that only information useful to other components of the spoken language processing system 100 is included. The context ranker 208 can determine which result is the most appropriate. The context ranker 208 may analyze scores to choose a single domain or result with which to proceed, or the context ranker 208 may generate an N-best list of likely user intents across all domains.

Each single-domain NLU module 202 may include several modules that implement various portions of NLU domain processing. As seen in FIG. 3, a single-domain NLU module 202 can include a tokenizer 220, a named entity recognizer 222, and an intent classifier 224. Some embodiments may include fewer or additional modules rather than only those shown in FIG. 3.

In operation, the multi-domain NLU engine 114 can receive a transcription or N-best list of transcriptions, such as those generated by an ASR module 112. The multi-domain NLU engine 114 can also receive hints, such as those generated by the dialog manager 116. The multi-domain NLU engine 114 may then initiate processing of the transcription in each available single-domain NLU module 202. The processing in the individual domains may proceed in parallel, such that processing of a transcription in multiple domains may take substantially the same amount of time as processing in a single domain.

The tokenizer 220 can transform a transcription from a collection of words into a series of tokens that may be processed. The tokenizer 220 may use various lexica to normalize words. For example, the tokenizer 220 can remove punctuations, convert digits to words (e.g., "911" to "nine one one"), etc.

The named entity recognizer 222 can label or tag individual words or tokens for further processing. For example, in the utterance "I want to play Gimme Shelter by the Rolling Stones," the words "I," "want," and "to" may be labeled as "other" because they do not, by themselves, indicate any specific user intent or provide any meaningful information. The next word, "play," indicates the command that is to be performed. Such a word or token may be labeled as a user intent, because the user intends for the system to play a song. The phrase "Gimme Shelter" may be labeled as a song title, while the phrase "Rolling Stones" may be labeled as an artist. Finally, the words "by the" may be labeled "other," because they are not actionable and provide no additional information. However, even words labeled "other" may be used to label other tokens. For example, the phrase "by the" may be an important indicator that what follows is the name of a musical artist, particularly when the words "by the" are preceded by a song title. In some embodiments, the named entity recognizer 222 can use hints to aid processing. For example, hint information indicating that the input likely relates to the artist "Rolling Stones" can be used if the input from the ASR does not match exactly the artist name "Rolling Stones," or if "Rolling Stones" can apply to multiple named entities in the music domain 202a (e.g., a song, album, and artist). In such cases, if there are several different possible options for "Rolling Stones," including artist, the named entity recognizer can select or bias the results towards "Rolling Stones" being the artist.

The intent classifier 224 can receive input from the named entity recognizer 222 and determine which intent, known to the single-domain NLU module 202, describes the most likely user intent. For example, the named entity recognizer 222 may label the token "play" as a user intent. The intent classifier 224 can determine which command or other response most likely captures the user intent. Illustratively, the music domain may determine that a programmatic "playSong( . . . )" command corresponds best to the user intent. The command may include arguments or parameters, such as one parameter for a song ID, or multiple parameters for the artist and song title. In some embodiments, the intent classifier 224 can use hints to aid processing. If an utterance can apply to several different intents (e.g., play a song, buy a song, etc.), the hints can help the intent classifier 224 to select or bias the results towards one that is consistent with the hint.

The cross domain ranker 204 can receive output from the several domain-specific NLU modules 202a, 202b and 202c and combine the results into a single result or N-best list of results. In some embodiments, domain-specific NLU modules 202 output an N-best list of results and scores associated with those results. The scores may indicate a confidence in each result or a likelihood that each result is the correct result. The cross domain ranker 204 can then combine each of the N-best lists into a single N-best list based on the scores. Returning to the example above, the music domain 202a may produce an N-best list of interpretations and corresponding scores, and the scores may be between 0.70 and 0.99 (where 0 is the minimum score and 1 is the maximum score). The phone domain 202c may also produce an N-best list of interpretations and corresponding scores. In the case of the phone domain 202c, however, the scores may be between 0.01 and 0.10. Each of the other domain-specific NLU modules 202 can produce its own N-best list of results and corresponding scores. The cross domain ranker 204 can combine the scores into single sorted N-best list of results and corresponding scores, such that the most likely interpretation is the first result in the N-best list or has the highest corresponding score. This scoring method is illustrative only, and not intended to be limiting. Other methods of scoring or ranking N-best lists, known to those of skill in the art, may also or alternatively be used.

The technique described above can be used when domain-specific NLU modules 202 are configured to recognize when an utterance is likely outside if its own domain. For example, the domain-specific NLU modules 202 may be exposed to text from other domains during the training processes. Such domain-specific NLU modules 202 can assign lower scores to their results—including the top result of the domain-specific N-best list—due to the reduced likelihood that the results are correct. The cross domain ranker 204 can then simply combine the results into a single N-best list or choose the best result, because the domain-specific NLU modules 202 have already normalized the data based on their ability to recognize when utterances are likely outside the specific domain that they are configured to process.

In some embodiments, the domain-specific NLU modules 202 may not be configured to recognize when utterances are likely outside of their specific domains. In such cases, the cross domain ranker 204 can normalize the scores from the domain-specific NLU modules 202 when generating the combined N-best list. Returning the previous example, the music domain 202a may return an N-best list of results with scores between 0.70 and 0.99. The phone domain 202c may also return an N-best list of results with scores between 0.70 and 0.99. The cross domain ranker 204 can use hints to assign weights to the scores from the various domain-specific NLU modules 202 or to otherwise normalize the results from the various domain-specific NLU modules 202. As a result, the cross domain ranker 204 can produce a combined N-best list that is sorted according to normalized scores or which otherwise indicates which results are the most likely across results from all domain-specific NLU modules 202.

The slot filler 206 can ensure that all data required to fully implement the user intent is present, and can also remove any unnecessary data. For example, the domain-specific NLU modules 202 may use more data in producing the N-best lists than is otherwise necessary for other components of the spoken language processing system 100 to take action in response to the user utterance. The slot filler 206 can therefore remove unnecessary information from the NLU results or otherwise modify the NLU results accordingly. In addition, the slot filler 206 can ensure that all information necessary implement the user intent is present. In the present example, the user may have said "Give Me Shelter" when issuing the voice command to play the song by the Rolling Stones. The slot filler may determine that there is no song by the Rolling Stones called "Give Me Shelter." By searching a catalog or other data store for songs by the Rolling Stones with a similar name, the slot filler 206 may determine that correct interpretation is to play the song "Gimme Shelter" by the Rolling Stones. In some cases, the slot filler 206 may require more information from the user, and the dialog manager 116 may be employed to prompt the user for the missing information. As another example, the user utterance may be "Remind me to pay the bills on the day after tomorrow." The user intent, as determined by the intent classifier 224 in conjunction with the named entity recognizer 222, may correspond to execution of a command such as "createReminder( . . . )." The command may require a parameter for the day on which the reminder is to be created. In addition, the command may require the day to be specified unambiguously. The slot filler 206 can translate the phrase "day after tomorrow" into a specific date for use with the "createReminder( . . . )" command. For example, if the current data is November 9, then the slot filler 206 can calculate that the day to be used in the "create Reminder( . . . )" command is November 11.

The context ranker 208 can use hints to select the most likely result from the N-best list or to re-order the results in the N-best list. For example, the current hint may indicate that the user is likely issuing a command to play a particular song. If the top-scored or most likely result in N-best list is that the user wants to buy the song "Gimme Shelter" by the Rolling Stones, rather than play the song, the context ranker 208 can re-rank the results in the N-best list such that the most likely result is that the user wants to play the song. As described above, due to the multi-domain nature of the NLU module 114, users can issue voice commands related to any domain rather than only the previously used domain or a currently active domain. In some cases, therefore, the context ranker 208 may not necessarily select or elevate the result that most closely corresponds to the current hint. For example, the most likely preliminary result in the N-best list may be substantially more likely than the result that most closely corresponds to the current hint (e.g., the difference between scores associated with the two items exceeds a threshold, or the result that most closely corresponds to the current hint is ranked below a threshold). In such cases, the context ranker 208 may not increase the score or rank of the result that most closely corresponds to the hint.

Process for Managing Generation and Usage of Identifiers

Figure 4:
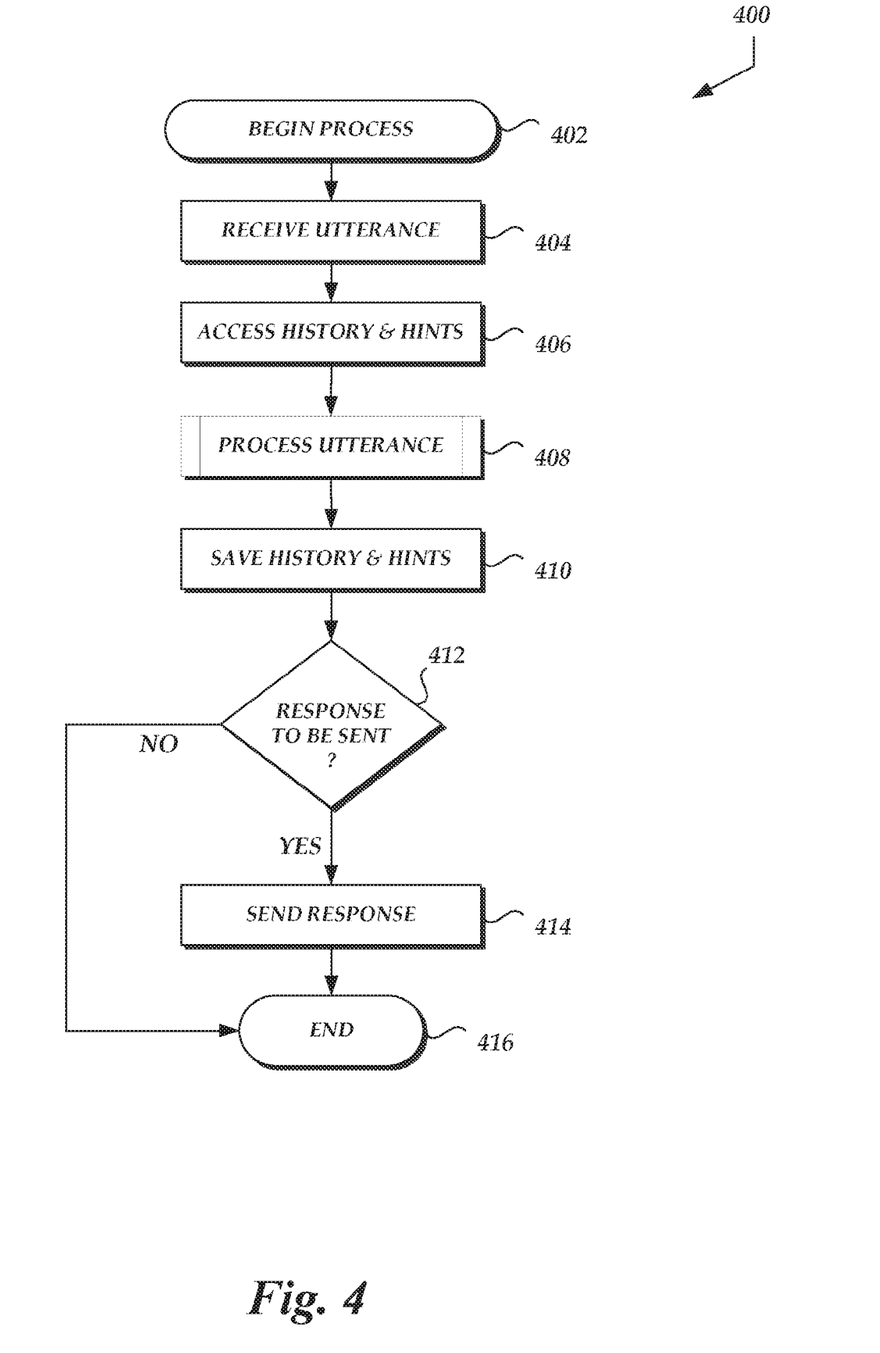
FIG. 4 is a flow diagram of an illustrative process for saving history, generating hints, and using the history and hints to process user interactions.

With reference now to FIG. 4, a sample process 400 for managing the generation and usage of hints in a spoken language processing system will be described. Advantageously, a spoken language processing system 100 may use the process 400 to save history data regarding user utterances and other interactions, and to generate hints based on prior user utterances and interactions. The history and hints may be used in processing subsequent user utterances and interactions.

The process 400 begins at block 402. The process 400 may begin automatically upon initiation of a speech recognition session. The process 400 may be embodied in a set of executable program instructions stored on a computer-readable medium, such as one or more disk drives, of a computing system of the spoken language processing system 100, such as an orchestrator 110 server. When the process 400 is initiated, the executable program instructions can be loaded into memory, such as RAM, and executed by one or more processors of the computing system.

At block 404, the spoken language processing system 100 can receive an utterance from a client device 102. As described above, the user utterance may be a spoken command to play a recorded music file.

At block 406, the spoken language processing system 100 can access history and/or hints that may be useful in processing the utterance. As described above, the history can be a record of user intents and/or responses associated with the user within a particular time frame or during a particular voice command session. Hints may be generated during or after processing of user utterances and saved for use in processing subsequent utterances. In some cases, data other than user utterances may be received from the client device 102. Such data may be saved in the history and/or used to generate hints to aid in further processing, and those hints may be accessed at block 406 to process the current utterance. For example, a user of a client device 102, such as a mobile phone, may raise the phone up to the user's head in a vertical position. The mobile phone may include proximity sensors to determine that the phone is currently positioned near the user's head. Data regarding this particular user action may be transmitted to the spoken language processing system 100 and stored as history. Such a user action may indicate that the user is about to initiate voice dialing, and therefore the data may be useful in generating hints, as described below.

At block 408, the spoken language processing system 100 can process the utterance as described in detail below with respect to FIG. 5. At block 410, history and hints based on the utterance, the processing of the utterance, and/or the response generated may be saved for use in processing further utterances.

Subsequent to, or in parallel with, saving history and/or hints, the orchestrator 110 can determine at decision block 412 whether a response is to be sent to the client device 102. For example, if an utterance is received that includes a request for playback of a particular musical recording, such as Beethoven's 5th Symphony, the dialog manager 116 of the spoken language processing system 100 may prompt the user to identify the particular recording artist (e.g., the Chicago Symphony Orchestra or the Berlin Symphony Orchestra). As described in detail herein, a TTS audio response prompting the user for the name of the recording artist may be generated and ready for transmission to the client device 102. In addition, history may be saved regarding the prompt, and the history can be used during a subsequent execution of the process 400. If a prompt, executable command, or some other response is ready for transmission, the orchestrator 110 can transmit the response to the client device 102 at block 414. Otherwise, the process 400 can terminate.

Data received subsequent to the execution of the process 400 may cause the process 400 to be executed again. Returning to an example described above, the user may provide a response to a prompt for a particular recording artist by submitting the utterance "the Chicago Symphony Orchestra." At block 406, data regarding the history and/or hints saved during previous executions of the process 400 may be accessed, and at block 408 the utterance may be processed. Based on the history (e.g., a request for playback of a Beethoven's 5th Symphony followed by a prompt for an artist's name), the hint used during processing of the subsequently received utterance may indicate that the utterance likely relates to an artist for the request to play a musical recording of Beethoven's 5th symphony.

Multi-Domain NLU Processing of a User Utterance

Figure 5:
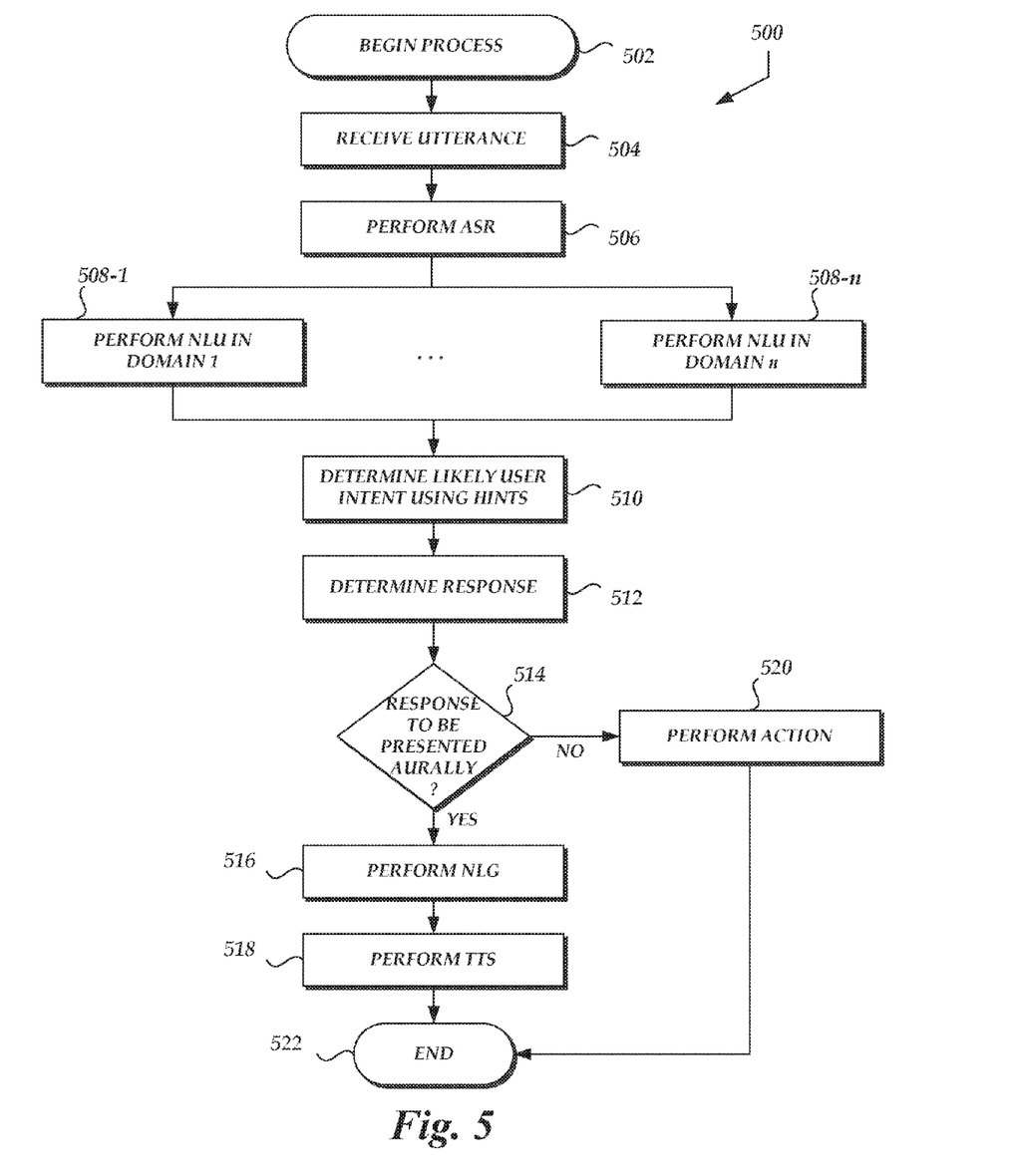
FIG. 5 is a flow diagram of an illustrative process for processing an utterance that may apply to one of multiple domains.

FIG. 5 illustrates a sample process 500 for processing a user utterance, received from a client device 102, with a multi-domain NLU engine. Advantageously, the process 500 may be used to process user utterances in multiple domains simultaneously or substantially simultaneously, and to select the best result or result most likely to be accurate from among the multiple results that are calculated.

The process 500 begins at block 502. The process 500 may begin automatically upon receipt of an utterance from a client device 102. The process 500 may be embodied in a set of executable program instructions stored on a computer-readable medium, such as one or more disk drives, of a computing device associated with the spoken language processing system 100. When the process 500 is initiated, the executable program instructions can be loaded into memory, such as RAM, and executed by one or more processors of the computing system.

At block 504, an utterance may be received by the spoken language processing server 100. For example, the user may have submitted a spoken command to initiate playback of a particular music recording. (e.g., "play Beethoven's 5th symphony by the Chicago Symphony Orchestra"). At block 506, the utterance may be transcribed into a likely transcription or N-best list of likely transcriptions by an ASR module 112 of the spoken language processing system 100. If any hints are available, they may be provided to the ASR module 112 in order to allow ASR module 112 to operate more efficiently and provide potentially more accurate results.

At blocks 508-1 to 508-n, the transcription or N-best list of likely transcriptions may be processed by any number of single-domain NLU modules in a multi-domain NLU engine. Each domain may process the transcription with respect to a particular subject matter, as described above. The domains may process the transcription in parallel or asynchronously so as to reduce the user-perceived time required to perform multi-domain NLU processing in comparison with single-domain NLU processing. In addition, a score may be assigned to each of the results.

At block 510, the most likely interpretation of user intent may be selected from the N-best list returned from the various single domain NLU modules. In some embodiments, response is selected based on the hint that was generated during or after processing of a previously received utterance or after receiving other information from the client device 102.

At block 512, the spoken language processing system 100 may determine a response to the utterance. The response can vary depending upon which domain provided the most likely analysis of the user's intent. Returning to the previous example, if the music domain produced an analysis of the utterance with the highest score, then an executable command to play the requested music may be the most appropriate response. However, if not all of the required information was included in the utterance, a prompt may be generated in order to get the additional information.

At decision block 514, the spoken language processing system can determine whether the response includes content to be presented aurally to the user, such a text that is to be read to the user. For example, if the spoken language processing system 100 determined that the user is to be prompted for additional information regarding the user's utterance, then the process may proceed to block 516. Otherwise, if no TTS processing is required, the process 500 may proceed to block 520, where a command corresponding to the likely user intent is generated or some other action is performed.

At block 516, an NLG module 118 may be employed to generate text for a spoken response such that the language of the response will sound natural to the user. For example, if the user has requested information about a particular product, information about the product (e.g., price, features, availability) may be obtained and provided to the NLG module 118. The NLG module 118 may output a string of text that can be synthesized as speech by a TTS module 112.

At block 518, the TTS module 112 can generate synthesized speech from a text input, such as text generated by an NLG module 118.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more processors in communication with the computer-readable memory, wherein the one or more processors are programmed by the executable instructions to:
   receive text data representing at least a portion of an utterance;
   receive hint data associated with the utterance;
   determine first ranking data using the text data and the hint data, wherein the first ranking data represents a relative rank of a first natural language understanding ("NLU") component of a plurality of NLU components, wherein the first NLU component is associated with a first domain;
   determine second ranking data using the text data and the hint data, wherein the second ranking data represents a relative rank of a second NLU component of the plurality of NLU components, wherein the second NLU component is associated with a second domain;
   select the first NLU component based at least partly on the first ranking data and the second ranking data; and
   generate a response to the utterance using the first NLU component and the text data.

2. The system of claim 1, wherein the one or more processors are further programmed by the executable instructions to generate NLU result data using the text data and the first NLU component, wherein the NLU result data represents a plurality of named entities, wherein a first named entity of the plurality of named entities corresponds to an intent associated with the first domain, and wherein a second named entity of the plurality of named entities corresponds to information regarding the intent.

3. The system of claim 1, wherein one or more processors are further programmed by the executable instructions to:
   identify a plurality of tokens in the text data;
   associate first token of the plurality of tokens with a first named entity;
   associate a second token of the plurality of tokens with a second named entity; and
   identify an intent that corresponds to the first named entity and the second named entity, wherein the intent is associated with the first domain.

4. The system of claim 1, wherein the first NLU component being associated with the first domain comprises the first NLU component being configured to generate NLU result data comprising intents associated with a subject matter of the first domain.

5. The system of claim 1, wherein the hint data indicates a likely domain with which the text data is associated.

6. The system of claim 1, wherein the one or more processors are further programmed by the executable instructions to generate the hint data based on at least one of a previous utterance or a previous response.

7. The system of claim 1, wherein the one or more processors are further programmed by the executable instructions to adjust at least one of the first ranking data or the second ranking data based at least partly on the hint data.

8. The system of claim 1, wherein the first domain is associated with intents related to at least one of: phone dialing, shopping, getting directions, playing music, or performing a search, and wherein the second domain is different than the first domain.

9. The system of claim 1, wherein one or more processors are further programmed by the executable instructions to:
   receive audio data representing the utterance; and
   generate the text data using the audio data and an automatic speech recognition ("ASR") component.

10. The system of claim 1, wherein executable instructions to generate the response comprise executable instructions to:
    generate response text data using a natural language generation component; and
    generate response audio data using the response text data and a text-to-speech component.

11. The system of claim 1, wherein one or more processors are further programmed by the executable instructions to send the response to a remote device configured to present the response.

12. A computer-implemented method comprising:
    under control of one or more computing devices configured with specific computer-executable instructions,
    receiving text data representing at least a portion of an utterance;
    receiving hint data associated with the utterance;
    determining first ranking data using the text data and the hint data, wherein the first ranking data represents a relative rank of a first natural language understanding ("NLU") component of a plurality of NLU components, wherein the first NLU component is associated with a first domain;
    determining second ranking data using the text data and the hint data, wherein the second ranking data represents a relative rank of a second NLU component of the plurality of NLU components, wherein the second NLU component is associated with a second domain;
    selecting the first NLU component based at least partly on the first ranking data and the second ranking data; and
    generating a response to the utterance using the first NLU component and the text data.

13. The computer-implemented method of claim 12, wherein receiving the hint data comprises receiving data indicating a likely domain with which the text data is associated.

14. The computer-implemented method of claim 12, further comprising generating the hint data based on at least one of a previous utterance or a previous response.

15. The computer-implemented method of claim 12, further comprising adjusting at least one of the first ranking data or the second ranking data based at least partly on the hint data.

16. The computer-implemented method of claim 12, further comprising generating NLU result data using the text data and the first NLU component, wherein the NLU result data represents a plurality of named entities, wherein a first named entity of the plurality of named entities corresponds to an intent associated with the first domain, and wherein a second named entity of the plurality of named entities corresponds to information regarding the intent.

17. The computer-implemented method of claim 12, further comprising:
   identifying a plurality of tokens in the text data;
   associating a first token of the plurality of tokens with a first named entity;
   associating a second token of the plurality of tokens with a second named entity; and
   identifying an intent that corresponds to the first named entity and the second named entity, wherein the intent is associated with the first domain.

18. The computer-implemented method of claim 12, further comprising:
   receiving audio data representing the utterance; and
   generating the text data using the audio data and an automatic speech recognition ("ASR") component.

19. The computer-implemented method of claim 12, wherein generating the response comprises:
   generating response text data using a natural language generation component; and
   generating response audio data using the response text data and a text-to-speech component.

20. The computer-implemented method of claim 12, further comprising sending the response to a remote device configured to present the response.

* * * * *